United States Patent [19]

Enterkin

[11] Patent Number: 4,569,116
[45] Date of Patent: Feb. 11, 1986

[54] AUTOMATIC STUD DRIVING MACHINE WITH PILOT HOLE PRE-DRILLING CAPABILITY

[75] Inventor: Dennis R. Enterkin, Greenfield, Ind.

[73] Assignee: Enterkin Manufacturing Co., Inc., Indianapolis, Ind.

[21] Appl. No.: 588,688

[22] Filed: Mar. 12, 1984

[51] Int. Cl.⁴ .......................................... B23Q 41/02
[52] U.S. Cl. ................................. 29/564.2; 29/783; 29/798; 29/809
[58] Field of Search .................... 29/564, 564.1, 564.2, 29/716, 809, 813, 26 A, 33 K, 33 D, 566, 783, 798; 144/1 R, 8, 18, 32; 81/435, 53.2; 227/50

[56] References Cited

U.S. PATENT DOCUMENTS

| Re. 28,608 | 11/1975 | Dixon | 29/809 X |
|---|---|---|---|
| 1,863,314 | 6/1932 | Phelps et al. | 29/707 |
| 2,806,494 | 9/1957 | Kull | 81/435 |
| 2,843,166 | 7/1958 | Van Alstyne | 81/435 |
| 3,015,117 | 1/1962 | Braendel et al. | 29/783 X |
| 3,583,054 | 6/1971 | Hughes | 29/564.2 X |
| 3,797,096 | 3/1974 | Nilsson | 29/564.2 X |
| 3,889,343 | 6/1975 | Miller et al. | 29/809 |
| 3,902,537 | 9/1975 | Donnelli | 29/810 X |
| 4,114,663 | 9/1978 | Viner | 81/435 |
| 4,201,255 | 5/1980 | Donnelli et al. | 29/810 X |
| 4,479,600 | 10/1984 | Albright | 29/798 X |

Primary Examiner—Gil Weidenfeld
Assistant Examiner—Glenn L. Webb
Attorney, Agent, or Firm—Woodard, Weikart, Emhardt & Naughton

[57] ABSTRACT

An improved apparatus for driving threaded fasteners into workpieces. The apparatus includes means for successively feeding workpieces to the first of two spaced apart work stations. A power drilling means drills holes into opposite ends of each workpiece at the first work station. The workpieces are then successively advanced to the second work station where a driving operation is performed. The driving operation is accomplished by successively feeding the threaded fasteners to a transfer station, transferring the fasteners from the transfer station to a loading station axially aligned with the second work station, loading the fasteners into the chuck of a power stud driver, and then driving the threaded fasteners into one of the pre-drilled holes. Transfer of the threaded fasteners between the transfer and loading stations is accomplished by pivotal movement of a placing arm and a finger attached to the placing arm. All operations are performed automatically and in timed relation to one another.

18 Claims, 6 Drawing Figures

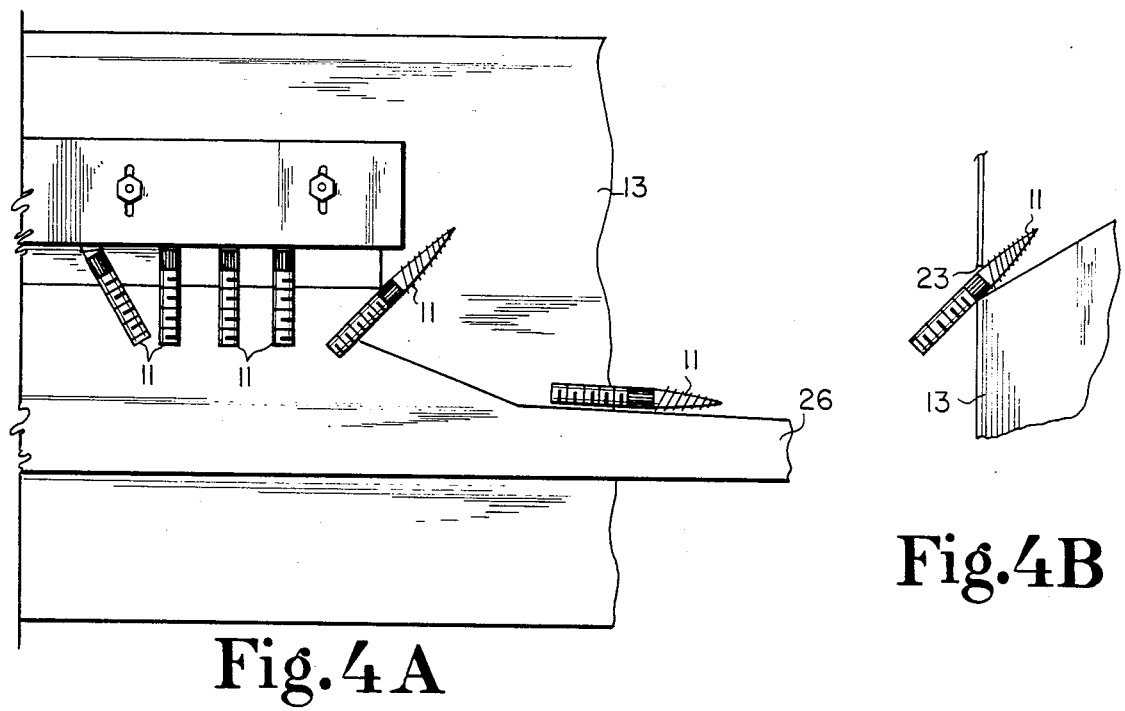
Fig.4A
Fig.4B
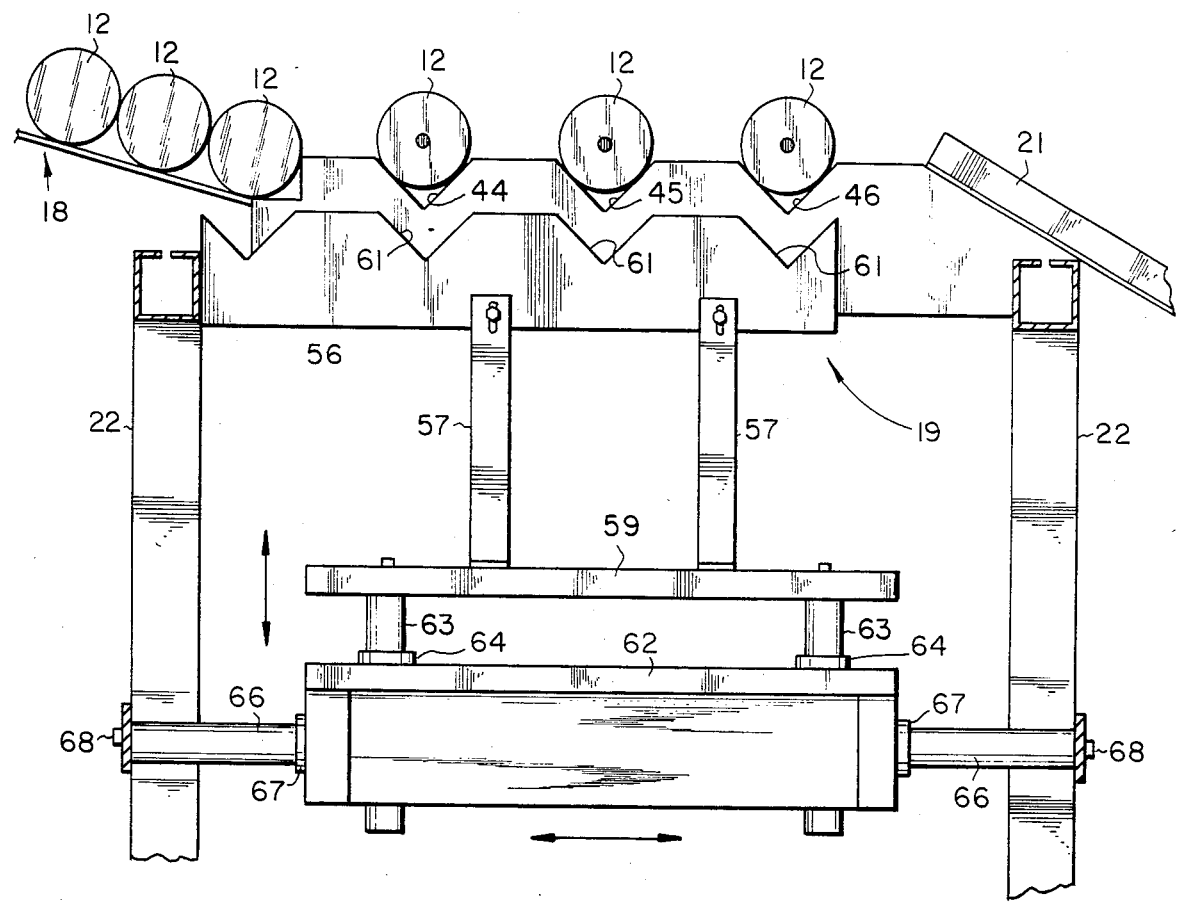
Fig.3

AUTOMATIC STUD DRIVING MACHINE WITH PILOT HOLE PRE-DRILLING CAPABILITY

BACKGROUND OF THE INVENTION

The present invention relates generally to the field of machines for driving threaded fasteners into workpieces and, more particularly, to machines of the above type which permit automated feeding of the workpieces and driving of headless fasteners.

In the assembly of workpieces, such as furniture legs, spindles, handles, supports, etc. it is often desirable to screw an elongated headless fastener, such as a hangar bolt or dowel screw, into the workpiece. The existing art discloses various devices which are useful for driving fasteners into workpieces, and the following patents are believed generally relevant to the present invention:

| U.S. Pat. No. | Inventor | Issued |
| --- | --- | --- |
| 1,863,314 | Phelps et al | June 14, 1932 |
| 2,806,494 | Kull | Sept. 17, 1957 |
| 2,843,166 | Van Alstyne | July 15, 1958 |
| 3,902,537 | Donnelli | Sept. 2, 1975 |
| 4,114,663 | Viner | Sept. 19, 1978 |
| 4,201,255 | Donnelli et al | May 6, 1980 |

U.S. Pat. No. 1,863,314 to Phelps et al. discloses an apparatus for automatically feeding screws having heads from a hopper into a device which inserts the screws into workpieces. The operation and usefulness of the apparatus is different from the present invention in that it does not screw the fastener into the workpiece, but instead pushes the screw laterally into a recess sized for a press fit therewith.

U.S. Pat. No. 4,114,663 to Viner discloses an automatic screwdriver for driving screws into a workpiece. This device is apparently not useful for driving headless fasteners. Moreover, alignment of the screws is not automated, since the gun is manually held and manipulated.

U.S. Pat. No. 2,806,494 to Kull discloses a screw feeding and driving apparatus which employs headless fasteners, in this case hollow set screws. The device is otherwise different than the present invention, notably, there not being disclosed any means for automatically drilling pilot holes into the workpiece as well as a means for automatically feeding the workpiece to the driving station.

U.S. Pat. No. 2,843,166 to Van Alstyne discloses a stud transfer and holding means for a stud driving tool. This device also does not disclose means for automatically drilling pilot holes into the work member or means for automatically feeding and advancing the work members.

U.S. Pat. No. 3,902,537 to Donnelli and U.S. Pat. No. 4,201,255 to Donnelli et al. both disclose means for threading headless fasteners into workpieces. Both devices are notably different from the present invention in that they require manual manipulation of the workpiece to drive the fastener into the workpiece. Further, no means for automatically drilling the pilot holes is disclosed.

SUMMARY OF THE INVENTION

An apparatus for driving threaded fasteners into workpieces, according to one embodiment of the present invention comprises a support frame mounting thereon a workpiece feeding means, a workpiece transfer means, a fastener feeding means, a fastener transfer means, a power drilling means, and a power driving means. The workpiece transfer means successively transfers the workpieces between spaced apart first and second work stations. The workpiece feeding means stores the workpieces and successively feeds the workpieces to the first of the spaced apart work stations. The fastener feeding means stores the fasteners and successively feeds the fasteners to a transfer station. The fastener transfer means successively transfers the fasteners from the fastener station to a loading station spaced apart from the transfer station. The power drilling means successively drills a hole in the workpieces at the first work station. The power driving means is actuable through a drive stroke for successively driving the fasteners into the holes of the workpieces at the second work station. The power driving means loads the fasteners at the loading station by relative axial movement of the driving means towards the fasteners in timed relation with the advancement of the workpieces between the work stations.

It is an object of the present invention to provide an improved apparatus for driving threaded fasteners into workpieces.

Related objects and advantages of the present invention will become more apparent by reference to the following figures and detailed description.

BRIEF DESCRIPTION OF THE DRAWINGS

FIG. 3 is an interior view looking in the direction of arrows 3—3 in FIG. 1 showing the operation of the workpiece transfer means.

FIGS. 4A-B depict the manner in which the fasteners exit the vibratory feed bowl and advance to the transfer station along the guide rail.

DESCRIPTION OF THE PREFERRED EMBODIMENT

Figure 1:
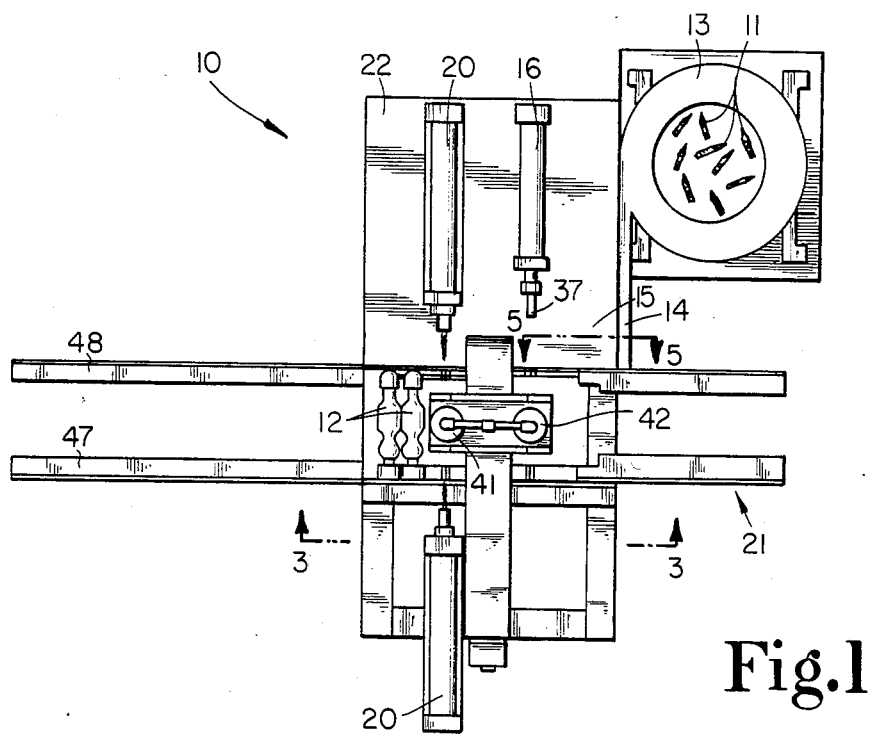
FIG. 1 is a top plan view of the apparatus of the present invention.
Figure 2:
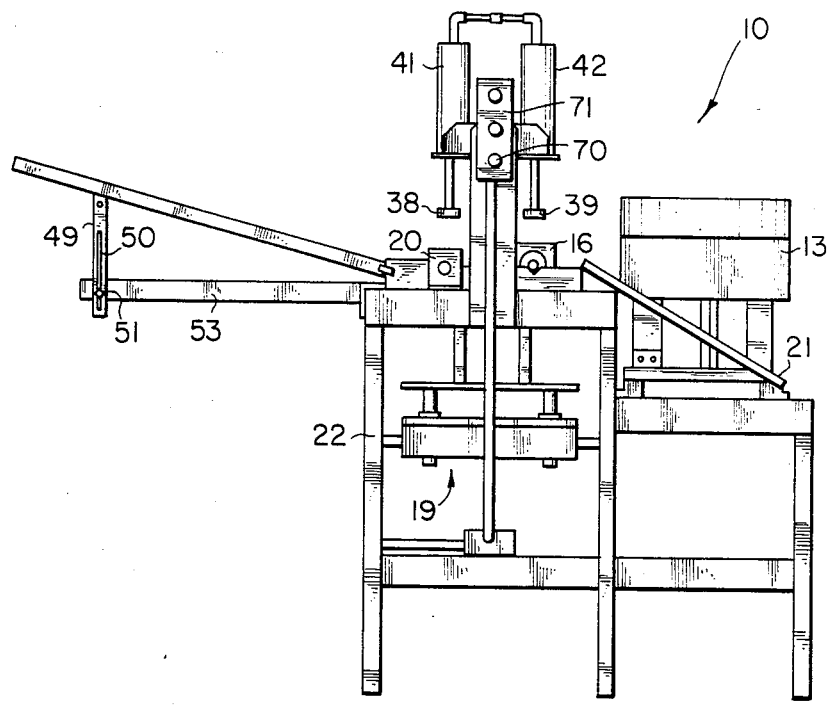
FIG. 2 is a front elevation view of the apparatus shown in FIG. 1.
Figure 5:
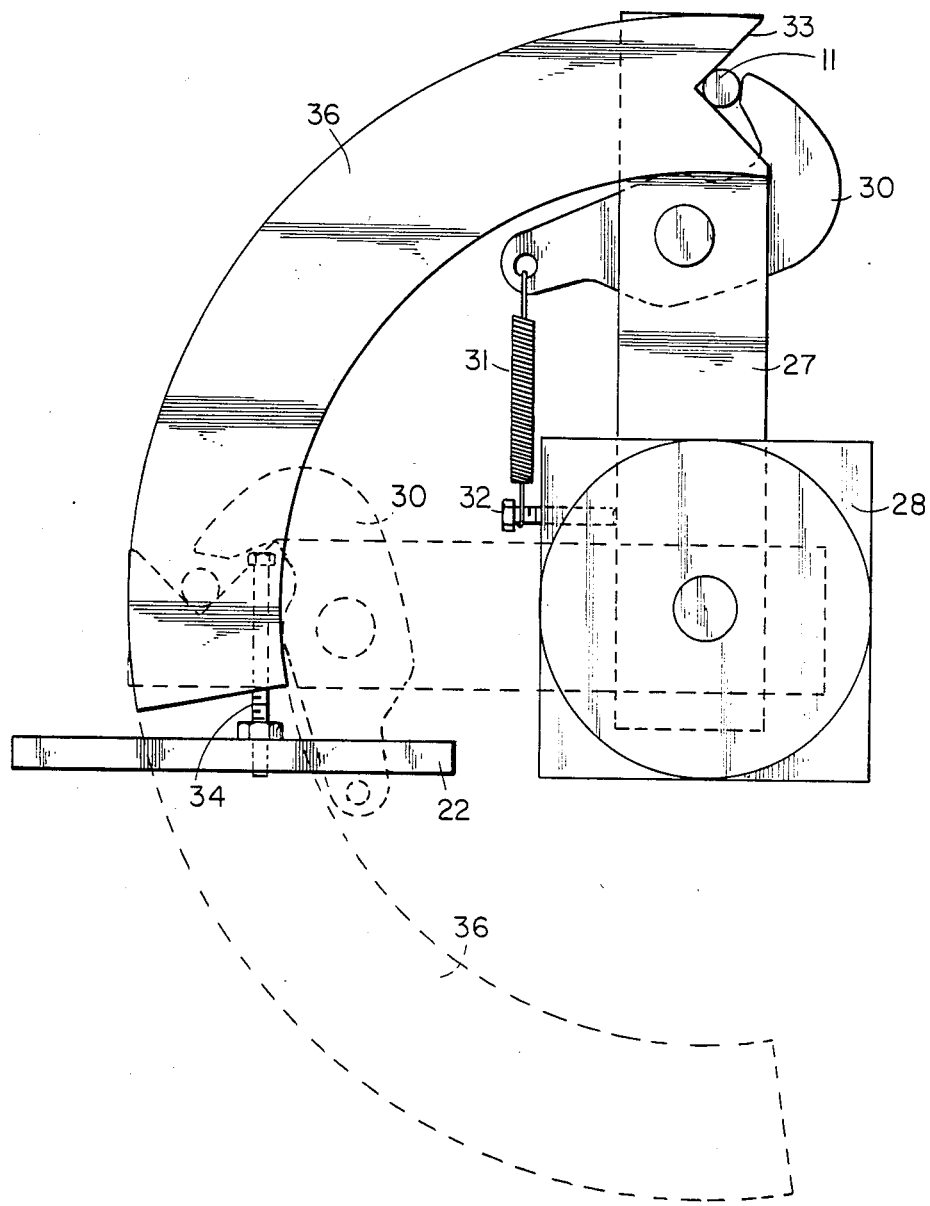
FIG. 5 is an interior view looking in the direction of arrows 5—5 in FIG. 1 showing the fastener transfer means and the manner in which the fasteners are conveyed thereby between the transfer and loading stations.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, there is shown the apparatus 10 of the invention which comprises a machine for automatically driving fasteners 11 into the ends of elongate workpieces 12. As seen in the drawings, workpieces 12 are elongated wooden spindles ornamentally shaped and having a circular cross-section at their respective ends. As also seen in the drawings, fasteners 11 are hanger bolts which are characterized by having a machine threaded portion at one end and a wooden screw thread portion at the other end. It is to be understood, however, that while the fasteners 11 and workpieces 12 are shown as just described, apparatus 10 can accept other elongate workpieces such as furniture legs, spindles, handles, supports, etc. of other cross-sectional shapes and sizes with none or only minor modification thereto. Similarly, other types of headless threaded fasteners, such as for example, dowel screws may also be accommodated in apparatus 10.

Specifically, the apparatus 10 includes a support frame 22 which supports the various other parts of apparatus 10, including vibratory feed bowl 13, guide rail 14, fastener transfer means 15, stud driver 16, workpiece transfer means 19 including gravity feed means 18, and a pair of drills 20 for floor mounting. Vibratory feed bowl 13 automatically orients the fasteners 11 for transfer along guide rail 14 to a transfer station located at the end of the guide rail. Vibratory feed bowl 13 stores the fasteners 11 and feeds the threaded fasteners through a slotted portion 23 in feeder track 24. The relative opening of slotted portion 23 is adjustable so that the machine threaded and unthreaded portions of fastener 11 will fall through the slot and thereby automatically orient the fasteners 11 point upward.

Each fastener 11 is retained within slotted portion 23 at an angle of approximately 45 degrees by the larger diameter wood screw threads and thereafter continues to move laterally to the end of the slot, whereupon the fastener 11 falls point forward onto a lower track 26 and exits feed bowl 13. In the preferred embodiment, vibratory feed bowl 13 is an 18" diameter standard screw feeder manufactured by Brown's Vibratory Feeder Bowls, Inc. of New Palestine, Ind., modified to feed headless fasteners. This type feeder will feed fastener sizes from a No. 8 screw to a $\frac{3}{8}$" diameter screw in lengths from 1 $\frac{1}{2}$" up to 3". Feed rate is variable from 0 to 100 fasteners per minute.

As fasteners 11 exit vibratory feed bowl 13, they are received along guide rail 14 which transfers the fasteners 11 a distance of approximately 12 inches horizontally to transfer means 15. Guide rail 14 serves as an inline vibratory feeder track which is slightly inclined so as to allow fasteners 11 to move longitudinally forward in single file under the influence of gravity with vibration of the track serving to overcome static friction.

From the transfer station located at the end of guide rail 14, the fasteners are conveyed by fastener transfer means 15 to a loading station axially aligned longitudinally with stud driver 16. Simultaneously, workpieces 12 are advanced from gravity feed means 18 by workpiece transfer means 19 to horizontally spaced apart work stations on support frame 22 where pilot hole drilling and fastener driving operations are automatically performed. After fasteners 11 are driven into one of the pre-drilled pilot holes in workpieces 12, the workpieces are automatically ejected along an exit chute 21 into a suitable container (not shown) for storage or shipment.

Fastener transfer means 15 includes a placing arm 27 pivotally mounted on a pneumatically operated rotary actuator 28. Rotary actuator 28 pivots placing arm 27 between horizontal and vertical positions corresponding to the loading and transfer stations, respectively, of fasteners 11. Finger 30 is pivotally mounted to placing arm 27 and is normally urged into a closed position relative to placing arm 27 under the bias of a coil spring 31 attached to finger 30 at one end and to a bolt 32 fixedly secured to placing arm 27, at the other end. Placing arm 27 has a V-shaped notch 33 at the outer end thereof in which is received the fasteners 11. An upstanding threaded stud 34 mounted to support frame 22 serves as a bearing surface against which finger 30 bears as placing arm 27 reaches the horizontal position, thus causing finger 30 to pivot into an open position relative to placing arm 27. The height of stud 34 is adjustable by screw movement in order to vary the relative opening between finger 30 and placing arm 27.

A gate 36 is fixedly secured to placing arm 27 and closes the otherwise open end of guide rail 14 so as to prevent succeeding fasteners 11 from entering the transfer station until placing arm 27 has returned to the horizontal position. In the vertical position, fastener 11 is held in axial alignment with the pre-drilled pilot hole in workpiece 12 and the chuck 37 of stud driver 16. Position of placing arm 27 is determined by a limit switch (not shown) mounted upon the motor of stud driver 16. The limit switch is positioned so as to signal the engagement of a fastener 11 by stud driver 16 and thereby activate the rotary actuator 28 to return placing arm 27 to the horizontal position. Fasteners 11 positioned on guide rail 14 are prevented from advancing by the presence of gate 36 until placing arm 27 reaches the horizontal position and finger 30 moves to the open position.

Stud driver 16 is fixedly mounted to support frame 22 and includes a self-opening driver head 37 rotatably mounted thereto and powered by a self-feeding pneumatic motor identical to that used to power drills 20. Driver head 37 is actuated axially horizontally relative to frame 22 through drive and retract modes. Driver head 37 automatically loads the fasteners 11, drives the fasteners to a desired depth, and releases the fasteners prior to retraction. Stud driver 16 is of conventional construction, and may, for example, be a number 100 series stud driver manufactured by Titan Tools, Inc. of Fairview, Pa. This type of stud driver will accept fasteners having diameters in the range from 3/16" to $\frac{3}{8}$" and lengths from 1$\frac{1}{2}$" to 4".

A pair of drills 20 are fixedly mounted horizontally relative to support frame 22 in longitudinal axial alignment with one another and laterally spaced apart from stud driver 16 approximately 6 inches. In the preferred embodiment, drills 20 are pneumatically powered and self-feeding. Drills 20 may, for example, be 31 LD 800 series drills manufactured by Rockwell, Inc. of Pittsburgh, Pa.

A pair of pneumatically operated cylinders 41 and 42 are vertically mounted on support frame 22 directly above the drilling and driving stations, respectively. Cylinders 41 and 42 respectively actuate a pair of members 39 and 40 in a vertical direction in order to maintain the position of workpieces 12 during the drilling and driving operations. This is accomplished by downward extension of members 39 and 40, thus urging workpieces 12 vertically downward and clamping the workpieces within V-shaped notches 44 and 45, which respectively correspond to the drilling and driving stations. The notches are V-shaped in order to accommodate workpieces 12 of varying diameters.

Gravity feed means 18 comprises a pair of parallel guide rails 47 and 48 which are inclined from the horizontal so as to permit the workpieces 12 to be gravity fed to the first work station. The inclination of guide rails 47 and 48 is adjustable by means of a corresponding pair of vertical supports 49 attached at the upper ends thereof to guide rails 47 and 48 and the lower ends to horizontally extending bars 53 attached to support frame 22. Each of the vertical supports 49 have an elongate vertical slot 50 for receiving a bolt 51 at a height which is vertically adjustable. It is to be understood that while only the vertical support 49 and bar 53 corresponding to guide rail 47 is shown in FIG. 1, another vertical support and bar identical to those shown, are similarly connected to guide rail 48. Each of the vertical supports 49 have a elongate vertical slot 50 for receiving a bolt 51 therethrough which is fixedly secured to a horizontally extending bar 53 attached to support frame 52.

In addition to gravity feed means 18, workpiece transfer means 19 includes a carriage assembly 55 fixedly mounted to support frame 22 directly beneath the drilling and driving stations. Carriage assembly 55 comprises a pair of horizontally disposed lift rails 56 each of which are fixedly mounted to the respective upper ends of a pair of vertically disposed connecting members 57. It is to be understood that while FIG. 3 shows only one lift rail 56, a second lift rail identical to lift rail 56 is also attached to carriage 59 parallel thereto and horizontally spaced therefrom.

Connecting members 57 are fixedly secured to the upper deck 59 of carriage 58. Each lift rail 56 is provided with a series of four V-shaped notches 61 equally spaced approximately 3 inches apart. Notches 61 are sized to receive therein workpieces 12 for conveyance between the various work stations in a manner which will be fully described herein below.

The upper deck 59 of carriage 58 is mounted for vertical movement relative to lower deck 62 by way of four upright shafts 63 bolted at their upper ends to upper deck 59 and slidably received in bearings 64 mounted in the lower deck 62. Carriage 58 reciprocates in a left-right direction as seen in FIG. 3 on a pair of horizontally disposed shafts 66 slidably received within bearings 67 fixedly mounted in lower deck 62. Each of the shafts 66 are fixedly secured at their respective ends to frame 22 by means of bolts 68. Vertical and horizontal motion of upper deck 59 is provided by conventional means, such as rotary actuators separately connected to shafts 63 and shafts 66 via a suitable linkage (not shown).

A complete cycle of operation of carriage 58, which results in workpieces 12 being advanced one position, is described by the following sequence of events. Carriage 58 is moved up 3 inches by the vertical actuator, 3 inches right by the horizontal actuator, 3 inches down by the vertical actuator, and 3 inches to the left by the horizontal actuator.

The top facing side of support frame 22 is provided with a pair of parallel disposed support rails 43 longitudinally spaced apart and extending laterally across the top facing side of support frame 22. Each of the support rails 43 define a series of three V-shaped notches 44-46 equally spaced apart approximately 3 inches along the length of rails 43. As seen in FIG. 3, the leftmost notch 44 corresponds to the station wherein the drilling operations are performed, whereas the rightmost notch 46 corresponds to the station where the fastener driving operation is performed. The middle notch 45 is an inactive station where no operations are performed.

The sequence of operation of the apparatus 10 may be described as follows. It is to be understood that conventional limit switches and air logic circuits are provided to control the sequence of events described below and that no further description of their construction is necessary for those of ordinary skill in the art. Apparatus 10 is activated by pushing "RUN" button 70 located on control panel 71. When apparatus 10 is activated, vibratory feed bowl 13 begins vibrating and carriage assembly 55 is actuated from the starting position through a complete operating sequence. Placing arm 27 is initially in the horizontal position, and gate 36 and finger 30 are both open so as to permit movement of fasteners 11 down rail 14 under vibration with the leading fastener moving into a position between placing arm 27 and finger 30.

Referring to FIG. 3, the starting position of carriage assembly 55 is described as follows. The leftmost V-shaped notch 61 of lift rail 56 is approximately 1 and ½ inches below and 3 inches to the left of V-shaped notch 44. Each carriage actuation sequence operates to advance workpieces 12 one position. Thus, the workpiece 12 in the rightmost V-shaped notch 46 is picked up by the rightmost V-shaped notch 61 in carriage assembly 55 and transported to the right as seen in FIG. 1 to the top most portion of exit chute 21. Upon lowering of lift rail 56, the workpiece contacts the downwardly inclined surface of permitted exit chute 21 and rolls downwardly and rightwardly until it travels off the lower end of exit chute 21 and into a suitable container (not shown). At the same time, a workpiece 12 maintained in the lower most position on guide rails 47 is picked up in the leftmost notch 61 of lift rail 56 and conveyed into the V-shaped notches 44 corresponding to the drilling station. Other workpieces at the drilling and intermediate stations are similarly advanced to the intermediate and driving stations, respectively.

A limit switch on carriage assembly 55 detects completion of the carriage assembly operation sequence and signals the rotary actuator 28 to pivot placing arm 27 clockwise to a vertical position. As placing arm 27 begins to pivot clockwise to the vertical position, gate 36 and finger 30 close and a fastener 11 is carried to the loading station. When placing arm 27 reaches the vertical position, the fastener 11 carried by placing arm 27 is aligned with driver head 37 and in position for loading. A limit switch (not shown) detects the presence of placing arm 27 at the vertical position and signals stud driver 16 to extend so as to permit driver head 37 to engage the fastener 11 therein. The limit switch simultaneously signals pneumatic cylinders 41 and 42 to extend so as to clamp workpieces 12 at the drilling and driving stations corresponding to V-shaped notches 44 and 46, respectively.

When stud driver 16 extends sufficiently to engage fastener 11 in driver head 37, another limit switch (not shown) detects the position of stud driver 16 and signals rotary actuator 28 to pivot placing arm 27 counterclockwise to the horizontal position corresponding to the loading station. As placing arm 27 begins to pivot counter-clockwise, finger 30 pivots clockwise against the fastener 11 fixedly secured in driver head 37. The finger 30 eventually clears fastener 11 and closes in a counter-clockwise manner under urging from coil spring 31.

Simultaneously with sending a signal to rotary actuator 28, the limit switch signals drills 20 to extend and initiate drilling operations so as to horizontally drill pilot holes at opposite ends of a workpiece 12 received within the V-shaped notches 44 corresponding to the drilling station. Once the drilling and driving operations, which are occurring simultaneously, are completed, drills 20 and stud driver 16 automatically retract and wait for the limit switch to signal movement of placing arm 27 to the vertical position, whereupon drills 20 are again activated into the drill mode and stud driver 16 is again activated into the drive mode.

The entire operation above described continues indefinitely as long as power is maintained and an unspent supply of fasteners 11 and workpieces 12 are maintained in vibrating feed bowl 13 and feed means 18, respectively.

Whole the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Thus, for example, an alternate workpiece feeding means may be employed which accomodates square cross-section or tapered workpieces. This may be simply accomplished by substituting the gravity feeding means and exit chute with lengthened support rails 43 and lift rails 56 having a greater number of V-shaped notches for an operator to load with workpieces.

What is claimed is:

1. An apparatus for driving headless threaded fasteners into workpieces, comprising:
    a support frame;
    a workpiece transfer means mounted to said support frame for successively transferring said workpieces between spaced apart first and second work stations;
    a workpiece feeding means mounted to said support frame for storing said workpieces and successively feeding said workpieces to the first of said spaced apart work stations;
    a fastener feeding means mounted to said support frame for storing said headless threaded fasteners and successively feeding said fasteners to a transfer station;
    a fastener transfer means mounted to said support frame for successively transferring said headless threaded fasteners from said transfer station to a loading station spaced apart from said transfer station;
    a power drilling means mounted to said support frame for successively drilling horizontally disposed holes in said workpieces at the first work station;
    a power driving means mounted to said support frame and actuable through a drive stroke for successively driving said headless threaded fasteners into said holes with said holes horizontally disposed at the second work station, said power driving means receiving the fasteners by relative axial movement of the driving means towards the fasteners, said driving means loading fasteners one at a time at the loading station in timed relation with the advancement of the workpieces between the work stations.

2. The apparatus of claim 1 wherein said transfer station is horizontally and vertically spaced apart from said loading station and said transfer means pivots between said transfer station, said loading station axially aligned with said driving means.

3. The apparatus of claim 2 wherein said fastener transfer means includes a placing arm and a finger attached to said placing arm, said finger movable relative to said placing arm between open and closed positions, said finger moving to said open position when said placing arm is at said transfer station thereby permitting said placing arm to receive therein one of said fasteners, said finger thereafter moving to the closed position in order to frictionally hold the fastener between said placing arm and said finger as the fastener transfer means pivots between the transfer and loading stations.

4. The apparatus of claim 2 wherein said fastener feeding means further includes a gate movable between open and closed positions in timed relation with the movement of the fastener transfer means, said gate being in the open position when the fastener transfer means is at the transfer station and thereafter moving to the closed position, said gate serving to control the feeding of the fasteners to the fastener transfer means.

5. The apparatus of claim 2 wherein said power driving means includes a piston means, said power driving means actuated and axially movable in the drive stroke by said piston means.

6. The apparatus of claim 2 wherein said power drilling means is actuable through a drill stroke for successively drilling holes in the workpieces at the first work station in timed relation with the advancement of the workpieces between said work stations, said power drilling means receiving the fasteners by axial movement of said drilling means towards the fasteners while the fasteners are maintained stationary relative to the support frame.

7. The apparatus of claim 3 wherein said fastener transfer means includes a spring normally urging the finger towards the closed position, said finger pivoting between the open and closed positions.

8. The apparatus of claim 3 wherein said fastener feeding means includes a vibratory feed bowl having an exit chute and a horizontal conveyor communicating with said exit chute and axially aligned with the placing arm when the placing arm is at the transfer station, said vibratory feed bowl orienting the fasteners in a desired uniform orientation for transfer along the conveyor to the fastener transfer means.

9. The apparatus of claim 3 wherein the opening of the finger relative to the placing arm is adjustable.

10. The apparatus of claim 5 wherein said piston means of said power driving means is pneumatically operated.

11. The apparatus of claim 6 wherein said power drilling means includes means for drilling a hole at each end of the workpieces, said power drilling means including a piston means and axially movable in the drill stroke by said piston means.

12. The apparatus of claim 11 wherein said workpiece feeding means is gravity operated.

13. The apparatus of claim 12 wherein said piston means of said power drilling means is pneumatically operated.

14. The apparatus of claim 13 wherein said first and second work stations are horizontally spaced apart.

15. The apparatus of claim 14 wherein said finger is pivotally attached to said placing arm.

16. The apparatus of claim 2 and further comprising a means for maintaining the workpieces stationary relative to said power drilling means and said power driving means at the first and second work stations, respectively, as the drilling and driving operations are being performed.

17. The apparatus of claim 16 wherein said means for maintaining includes a pair of clamping arms vertically disposed above said first and second work stations and actuable by pneumatically operated pistons between a closed position wherein the workpieces are fixedly clamped to said maintaining means and an open position, vertically spaced from the closed position, wherein the workpieces may be removed from the maintaining means.

18. The apparatus of claim 17 wherein said power driving means receives the fasteners by relative axial movement of the driving means towards the fasteners while the fasteners are maintained stationary.

* * * * *